United States Patent [19]

Phillips

[11] 4,215,895
[45] Aug. 5, 1980

[54] SAFETY BARRIER FOR RECREATIONAL VEHICLE DOORWAY

[76] Inventor: Albert J. Phillips, 7901 Clearwater, Space 148, Kennewick, Wash. 99336

[21] Appl. No.: 21,629

[22] Filed: Mar. 19, 1979

[51] Int. Cl.² .............................................. B60P 3/32
[52] U.S. Cl. ..................................... 296/202; 280/749
[58] Field of Search ............ 280/748, 749; 296/23 R; 105/466, 467; 160/133, 271, 273 R, 237

[56] References Cited

U.S. PATENT DOCUMENTS 3,014,755  12/1961  Kennedy .............................. 280/748

Primary Examiner—John J. Love
Assistant Examiner—John A. Carroll

[57] ABSTRACT

A flexible net-like covering for the doorway of a recreational vehicle to prevent occupants or objects from falling through the accidentally opened door. The covering, carried by a roller biased to a rolled condition and positioned above the recreational vehicle doorway, is manually extendable downwardly to cover the doorway. The sides of the covering provide fasteners movably carried in channels positioned on the sides of the doorway to maintain the net in operative position covering the door against applied forces.

1 Claim, 10 Drawing Figures

SAFETY BARRIER FOR RECREATIONAL VEHICLE DOORWAY

II. BACKGROUND OF INVENTION

IIA. Related Applications

There are no prior patent applications relating hereto filed in this or any foreign country.

IIB. Field of Invention

This invention relates generally to vehicular doors and more particularly to a secondary net-like safety covering, positionable inside the primary rigid door of a recreational vehicle to cover the doorway.

IIC. Description of Prior Art

In the use of recreational vehicles of various types an object or occupant may fall through a doorway that has been unexpectedly or accidentally opened. The results of this happening oftentimes are quite serious especially if the vehicle be in motion, and the potentiality for the happening is substantial especially during motion. The instant invention seeks to provide means to alleviate this problem.

The common present day recreational vehicle is of a generally rigid construction that provides hingably mounted doors for ingress and egress. By reason of the particular structure common to such vehicles, and also by reason of their operation and use, their rigidity is not absolute and there commonly is a substantial and generally constant motion of parts relative to each other. This motion becomes a particular problem with door structures as if oftentimes causes or allows doors to open accidentally and unpredictably notwithstanding various biasing and latching mechanisms associated with the door. Either the same motion that opens the door or further motion of the vehicle may cause or aid either a vehicle occupant or some object in the vehicle to accidentally pass outwardly through the open doorway or other similar orifice with serious consequences.

Both problems of people and objects passing outwardly from a recreational vehicle through an accidentally opened orifice have heretofore been recognized and various solutions proposed. In general the proposed solutions form a first class of devices which positionally maintains either the object or person in the vehicle by means of some sort of physical restraint and a second class which provides some sort of cover for orifices to prevent passage of either an object or person outwardly therethrough. It is with this second class of devices that the instant invention is concerned.

This second class of covers may for convenience of consideration be subdivided into a first group of rigid barriers and a second group of non-rigid, flexible or semi-flexible barriers. The rigid barriers heretofore known have generally been of the same general nature as the original primary door. If such a rigid structure be mounted by means of a hinge-latch type mounting this auxiliary structure generally suffers from substantially the same disabilities as the primary door structure and is subject to substantially the same potentiality of accidental opening. In fact, quite commonly the same forces that might cause a primary door to open have a reasonably high potential of causing a secondary rigid safety door to open simultaneously and thus really provide no solution to the primary problem. Most movable, fastenable door mountings that provide an opening convenience similar to the hinge-latch mounted door generally suffer from similar disabilities to a greater or lessor extent. As the mounting and releasable fastening of a rigid door becomes more certain or more substantial, the probability of the doors' opening generally becomes less but at the same time the convenience and ease of operation of the door also becomes less and less. Because of these problems rigid type secondary safety doors or barriers though known have not been popular or come into general public use.

The second group of flexible barriers by reason of their physical nature are not nearly so likely to be accidentally openable by reason of the normal operation of recreational vehicles. The opening and fastening of this type of flexible cover generally depends upon some principal quite different from that required for a hingably mounted, latch fastened rigid door and because of this there is not nearly so much probability that any force likely to open the primary rigid door is likely to open the secondary safety door. In fact in general the forces and motion required to open one type door are not particularly related to those required to open the other and there is almost no probability that one single force would accidentally open both. The flexible type barrier also tends to offer much more convenience in storage, operation and function and tends to be of lower cost than the rigid type barriers. Undoubtedly because of these factors the flexible, non-rigid or semi-rigid type safety barrier has not only become known but also become more popular than the rigid barrier. The instant invention seeks to provide a new and novel member of this class of device.

The non-rigid barriers of this type known in the prior art have generally been used in vehicle orifices other than doorways, principally windows or interior passageways such as between the living space and sleeping space of a trailer, the front seat and back seat of a stationwagon or the seat and cargo space of a van-type vehicle. These restraining devices have generally been of a relatively smaller aerial extent than one required to cover a doorway and because of this generally have taken the form of a net-type device without any particular fastening about any substantial part of the periphery of the particular device. The instant invention is distinguished from this type of barrier in that it does provide a positive fastening of the barrier around a substantial portion of the doorway to be covered and it has been found that this type of fastening is necessary for effective use of such a device to cover orifices that are as extensive as recreational vehicle doorways. The particular fastening means provided establishes a positive fastening on both sides and the top of the doorway to be covered. An auxiliary barrier of this nature must also be readily storable and yet easily and simply positionable for use. The instant invention provides a roller type storage for the net barrier immediately above the doorway or orifice to be serviced to fulfill this requirement and yet aid in allowing the fastening of the barrier about the orifice periphery as required. A particular channel and slide fastening mechanism associated with the sides of the barrier allow the simple and easy motion of the barrier from a stored to an operative position, but yet fulfill the fastening requirements. All of these features are uniquely combined in the instant invention to distinguish it from any of the known art in its class either individually or in combination.

III. SUMMARY OF INVENTION

My invention provides a secondary flexible net-like safety barrier for the doorway of a recreational vehicle.

In so doing I provide a net carried during non-use by a storage roller immediately above the doorway to be serviced but manually movable across the doorway to cover it during use.

The storage roller is biased to a barrier storing position and normally so maintained unless deliberately changed. The sides of the barrier net are provided with plural fasteners movably carried by rigid paired opposed side elements to movably fasten the periphery of the net to the sides of the doorway to be serviced when the net be extended downwardly thereacross. Releasable fastening means are provided to maintain the net in operative position as desired. The barrier net itself comprises a fabric mesh generally formed by two sets of perpendicularly interwoven bands joined at their intersections.

In providing such a safety barrier it is:

A principal object of my invention to provide a flexible net-like covering for a doorway of a recreational vehicle that is movable from a stored position above the doorway to an operative position covering the doorway and releasably maintainable in this operative position.

A further object of my invention to provide such a covering that is readily manually movably across a serviced doorway to an operative position but is yet fastened about a substantial part of the periphery of the doorway.

A further object of my invention to provide such a covering that is readily usable in existing recreational vehicles without any special adaptation of either vehicle or barrier net.

A still further object of my invention to provide such a barrier net that is of new and novel design, of rugged and durable nature, of simple and economic manufacture and otherwise well adapted for the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement with only one practical and preferred embodiment being illustrated in the accompanying drawings as is required.

IV. BRIEF DESCRIPTION OF DRAWINGS

In the accompanying drawings which form a part hereof and wherein like numbers of reference refer to similar parts throughout:

V. DESCRIPTION OF THE PREFERRED EMBODIMENT

Figure 1:
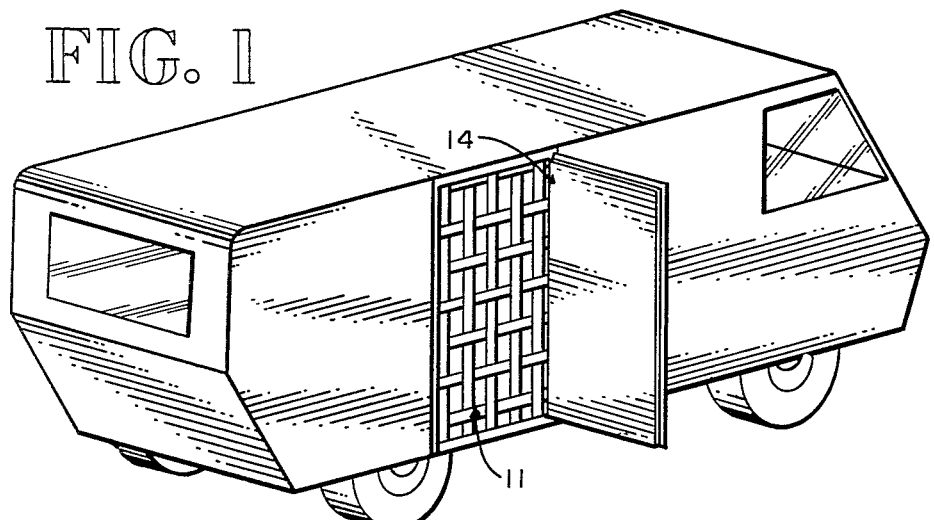
FIG. 1 is an orthographic side view of the typical travel trailer with my invention in place in the open doorway thereof.

Referring now to the drawings in more detail it will there be seen that my invention generally comprises elongate cylindrical storage roller 12 rollably storing flexible barrier net 11 for manual positioning over recreational vehicle door 14 where the barrier net is laterally retained by guide channels 13 carried on the sides of the doorway.

Figure 2:
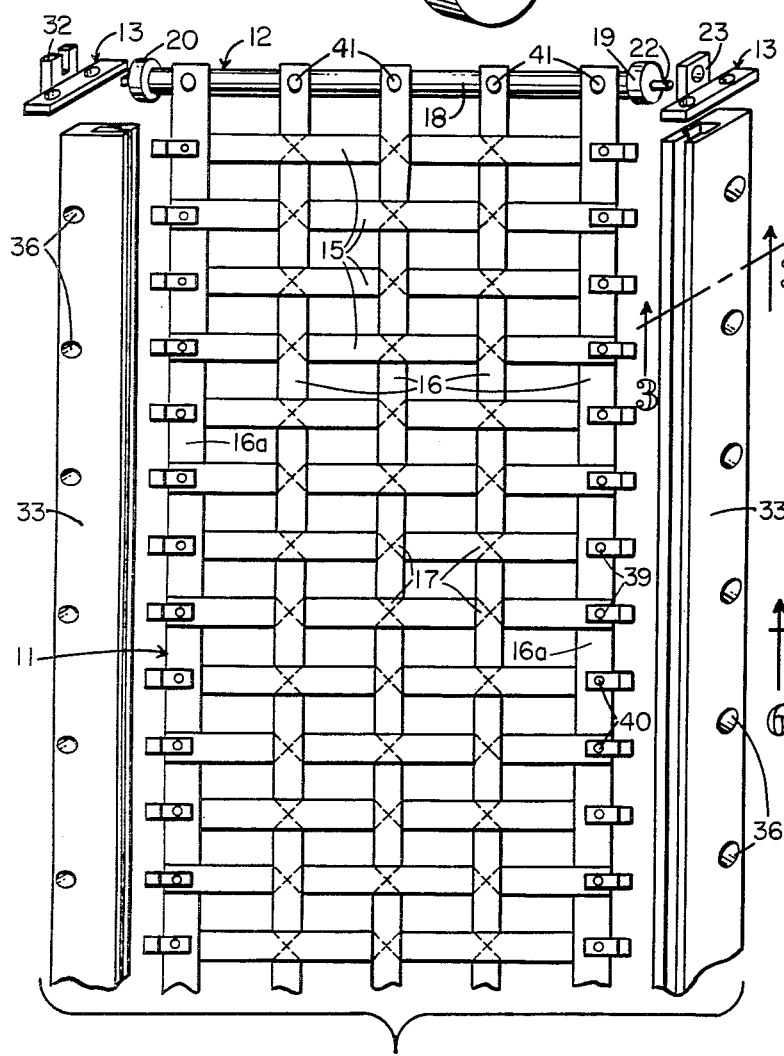
FIG. 2 is an expanded orthographic surface view of my invention showing its various parts, their configuration and relationship.

Barrier net 11 is a flat, rectangular member formed by plural, spaced, horizontal tapes 15 interwoven with plural spaced vertical tapes 16 to form the net illustrated particularly in FIG. 2. The tapes commonly, though not necessarily, will be joined at their intersections 17 by some means such as stitching or adhesion to maintain the spaced relationship of the elements and provide additional strength for the composit net structure. Tapes 15, 16 of which the barrier net is formed are preferably of woven webbing fabric though they may be formed of any flexible material of appropriate physical strength and yet fulfill the purposes of my invention. The vertical sides of net 11 will commonly though not necessarily terminate with the edge of a vertical tape 16 to aid in maintaining better alignment and spaced positioning of associated side fastening elements. Similarly the bottom of the net will preferably, though not necessarily, terminate with the edge of a horizontal tape 15a to provide more strength and a finished edge. The physical characteristics of the net should be such as to allow it to withstand a force of several hundred foot-pounds which might be generated by a body of 200 odd pounds being forced into the net structure at a velocity of a few feet per second, such as might occur with a person accidentally falling against the net. Common, two inch wide cotton canvas-type webbing material of commerce has been found quite satisfactory for this purpose when arrayed as illustrated and joined as indicated. The peripheral configuration of barrier net 11 is similar to that of the recreational vehicle doorway to be serviced, and the net size should be slightly greater by a matter of a few inches than that of the doorway so that the net may be positioned and fastened as hereinafter indicated.

Figure 7:
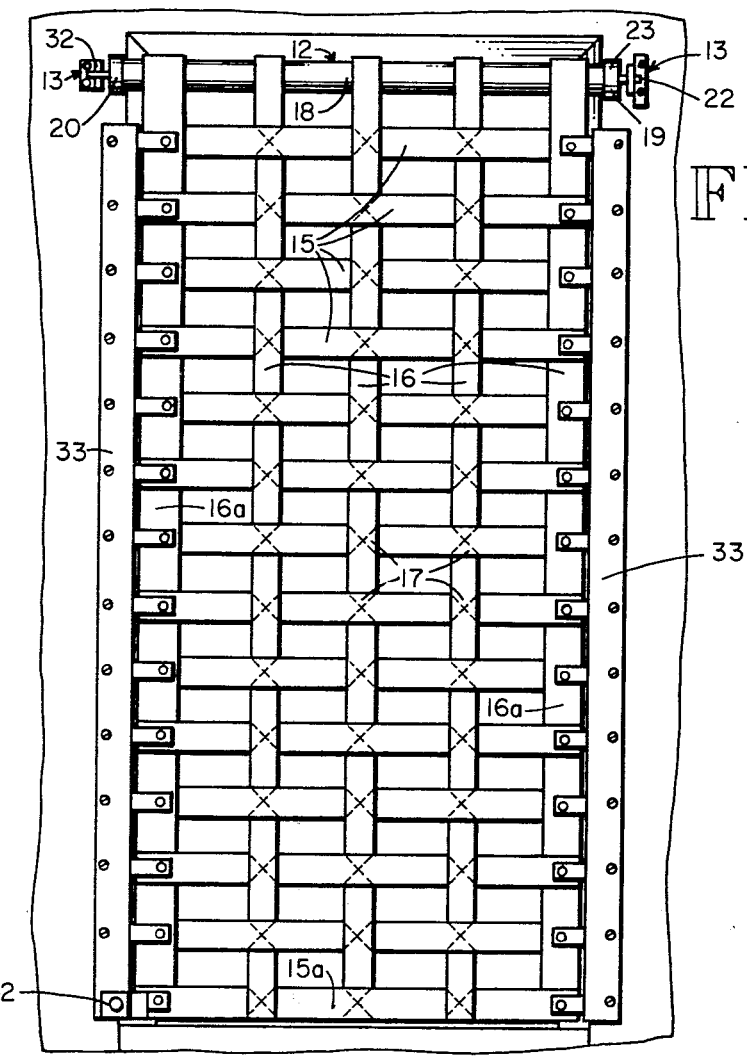
FIG. 7 is an orthographic surface view, looking outwardly from inside a recreational vehicle, showing my invention installed in the doorway of the recreational vehicle.
Figure 8:
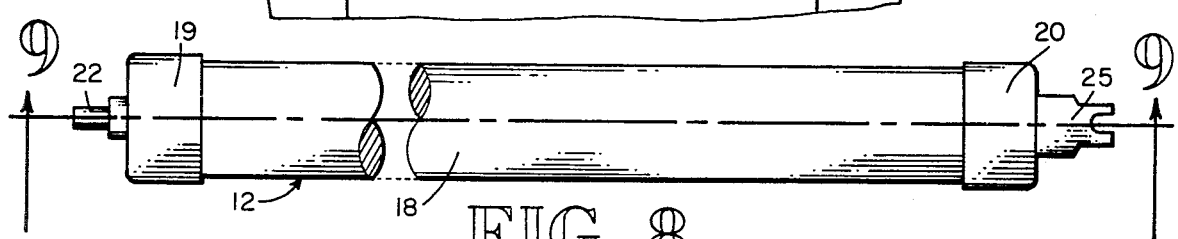
FIG. 8 is a partial orthographic surface view of the storage roller of my invention.
Figure 9:
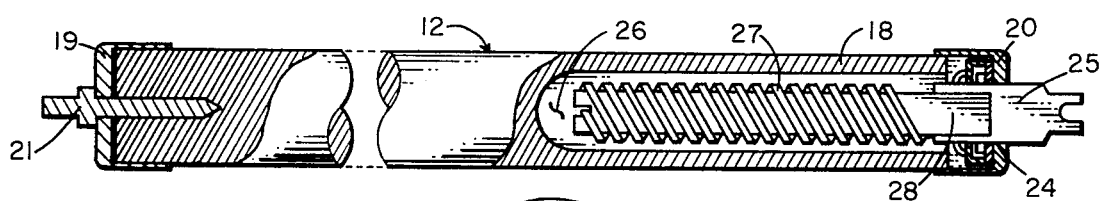
FIG. 9 is an orthographic view of the roll of FIG. 8 partially cut-away to show the internal biasing mechanism and mounting structure of the storage roll.
Figure 10:
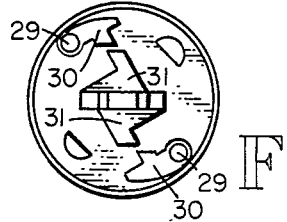
FIG. 10 is an orthographic end view of the biasing mechanism of the roller of FIG. 8 with the protective end cap removed to show structural details.

Storage roller 12 is an elongate cylindrical structure as illustrated particularly in the drawings of FIGS. 8, 9 and 10. It comprises rigid elongate roller body 18 carrying mounted cap 19 at one end and biasing cap 20 at the other end. Roller body 18 is preferably a wooden dowel of a length slightly greater than the width of the horizontal tapes 15 of the barrier net to allow mounting and storage of that net upon the roller. Mounting cap 19 is the cup-like structure illustrated, defining medial hole 21 to allow passage of mounting pin 22 which has an elongate nail-like body engagable in the medial portion of roller body and an outwardly extending cylindrical portion to allow rotatable mounting of the roll in associated "L" shaped pin bracket 23 as shown particularly in the illustration of FIGS. 2 and 7. Both the mounting cap and the biasing cap are positionally maintained on the respective ends of roller body 18 by means of a press fit between the elements. Biasing cap 20 is of configuration and structure similar to the pin cap but with a larger medial hole 24 to rotatably accept biasing bar 25. This biasing bar 25 is an elongate element extending into biasing bar chamber 26 defined in the medial end portion of roller body 18. The inner portion of biasing bar 25, within the biasing bar chamber, irrotatably carries torsion spring 27 thereabout. The other end of the torsion spring is irrotatably fastened to roller body 18. Fastening plate 28 is carried within biasing cap 20. The outer surface of the fastening plate pivotably mounts, by paired opposed biasing dog pins 29, similar biasing dogs 30 which cooperate with biasing bar cam 31 to control rotation of the roller body 18 relative to biasing bar 25. The cam and dogs 30, 31 are so shaped, as illustrated in FIG. 10, to allow one directional rotation of roller body against the bias of torsion spring 27 and prevent counter-rotation under normal conditions but yet allow such counter-rotation after a sharp turn against the rotary bias to release the dogs from the cam and allow return of the roller body to a null or rolled position by reason of the bias caused by spring 27. "L" shaped bar mounting bracket 32 irrotatably mounts biasing bar 25 on a structural element of a doorway frame. This general type of roller and biasing structure is well known in the prior art particularly as related to common window blinds and because of this it is not specified in gross detail and no claim is made to the structure per se, but rather only in combination with other elements.

Figure 3:
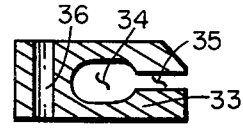
FIG. 3 is an orthographic cross-sectional view of the side channel element of FIG. 2 taken on the line 3—3 thereon in the direction indicated by the arrows.
Figure 4:
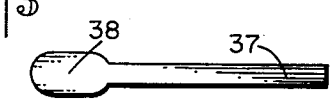
FIG. 4 is an orthographic side view of one of the side fasteners of my invention movably engagable within the channel of the side channel element.
Figure 5:
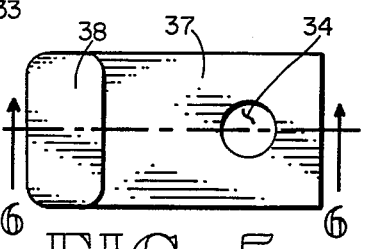
FIG. 5 is an orthographic surface view of the same fastener as is illustrated in FIG. 4.
Figure 6:
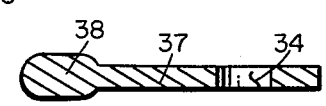
FIG. 6 is an orthographic cross-sectional view of the fastener of FIG. 5 taken on line 6—6 thereon in the direction indicated by the arrows.

Lateral guide channels 13 are rigid, elongate elements as illustrated particularly in FIGS. 2 and 3. They are formed by body 33 of substantially rectilinear configuration defining the elongate fastener channel having inner larger portion 34 and outer smaller portion 35 communicating to one side of the body. This fastener channel 34, 35 is defined substantially parallel to the guide channel body surface to extend longitudinally therethrough. The surface defining the channel is preferably configured with uniform curvilinear cross-sectional shape to aid in preventing fastener hang-ups therein when fasteners move therethrough. The uppermost portion of the channel may be somewhat enlarged to create a flared effect to make the entry of fasteners therein more easy than would be the case were the flare not present. Plural spaced fastening holes 36 are provided in spaced linear array inwardly adjacent the longer side edge of body 33 opposite that side edge through which fastener channel 34, 35 extends. The external cross-sectional configuration of the lateral guide channels is not particularly critical to my invention so long as it be appropriate to allow fastening to a supporting structural element and provide rigidity for fastener support. The length of the channels should be substantially the same as the vertical dimension of a recreational vehicle doorway to be serviced.

Plural rectangular side fasteners carried by each vertical side element of the barrier net are formed with thinner body 37 and thicker channel engaging element 38 to provide a slidable fastening between the barrier net and lateral guide channels 13. The medial portion of thinner body 37 defines fastener hole 39 to aid attachment of the fasteners to the sides of the barrier net. Thinner body portion 37 is of slightly less dimension than the outer smaller portion 35 of the fastener channel and the thicker channel engaging element 38 is slightly smaller than the inner larger portion of the fastening channel to allow a free sliding movement of the fasteners along the fastening channel when the two be engaged. Preferably, though not necessarily, all external edges and corners of the fasteners that are carried within fastening channels 34, 35 are slightly rounded to aid in preventing catching or fouling of the fasteners during lineal motion in the fastening channel. Fasteners 37, 38 may be formed of any rigid material of appropriate physical strength but I prefer a polymeric material because of ease of manufacture, low cost and a surface of low frictional nature.

A plurality of fasteners 37, 38 are fixedly fastened to each edge of vertical tapes 16a of the barrier net in a spaced relationship as illustrated particularly in the drawings of FIGS. 2 and 7, but the spacing of the fasteners along the edge of barrier net 11 is not critical so long as the resulting structure provides the physical strength specified. Preferably one fastener will be fastened at each point of intersection of a horizontal tape with the vertical side tapes to provide strength and positional stability for the barrier net when in use. The fastening of fasteners 37, 38 to barrier net 11 may be accomplished by any of the common means of mechanical joinder of such elements but preferably, as in the instance illustrated, this joinder will be by a combination of adhesion and rivets 40 passing through holes 39 in each fastener and through a hole (not illustrated) appropriately aligned and defined in the net. This fastening well may be accomplished by other known means.

Commonly my invention will be partially pre-assembled as illustrated in FIG. 2 prior to sale and installation in a recreational vehicle. The partial assemblage will include the joinder of plural fasteners 37, 38 to barrier net 11 and the fastening by some appropriate mechanical joinder of one edge of the barrier net to the medial portion of roller 12. This net-roller joinder in the example illustrated in FIG. 2 is by means of plural headed nails 41 passing through the net and into the roller, though it well could be by many other mechanical fastening means such as adhesion, screws, stapling or otherwise and remain within the ambit of my invention. Rigid side channels 33 and roller support brackets 23, 32 are generally not pre-assembled before installation of the invention.

To install my invention in a recreational vehicle, mounting pin bracket 22 and biasing bar bracket 32 are mounted on the inside wall of the vehicle immediately above and laterally on the upper edge of a doorway casement or defining structure as illustrated in FIG. 7 so that roller 12 when carried thereby will be positioned immediately above and substantially parallel to the upper periphery of the doorway. The two rigid side channels 33 are then each mounted on the inside vehicle wall adjacent and parallel to each of the vertical side elements defining the doorway and at a parallel spaced distance apart such as to maintain the barrier net without any substantial tension in a flat, planar condition therebetween.

This fastening of the guide channels to the recreational vehicle walls is preferably accomplished by headed screws inserted through holes 36 in the guide channels to engage the structure therebeneath.

Roller structure 12 with barrier net 11 rolled thereon is then established in roller brackets 23, 32 and the lower or radially outer edge of the barrier net is so positioned as to establish at least the first opposed cooperating fasteners 37, 38 respectively in the opposed guide channels 33. In this condition then the safety barrier is installed and ready for use.

To use the device it is merely manually manipulated by pulling the bottom element of barrier net 11 downwardly until the lower element of the net reaches the bottom guide channels 33 at the floor level with the fasteners carried by the net sides engaged in the respective guide channels. The safety barrier is then in operative position to prevent objects or persons from accidentally passing through the door opening serviced if the principal door be open.

If desired, although not necessary to my invention, one or more catches 42 may be provided to releasably maintain the lower portion of the safety barrier in operative position. These catches are not necessary as the net normally will be positionally maintained by reason of gravity or friction or both after it is once established, but the catches are convenient and add an additional safety factor. Many of the releasable catches heretofore known and available in commerce may be used for this purpose.

To release the safety device to its stored or inoperative position, it is merely necessary to sharply pull the barrier net downwardly and then release it. The sharp downward pull will cause a release of the catch mechanism of the roller structure and allow that structure to re-roll the net by reason of the bias established in the biasing mechanism by originally pulling the barrier net out. If a catch 42 be used, obviously it must be released before this operation may be accomplished.

It is to be noted that in manually moving the barrier net 11, since it is of a flexible nature, it may be best moved by exerting a similar force on and creating a similar positioning of each of its side elements at the same time. If the net becomes skewed relative to the side elements, the fasteners on its sides may tend to foul in the channel guides and this may cause the net to be unevenly rolled or unrolled upon the roller structure 12 or if skewing be severe it may even prevent net motion. A force exerted at the middle of the lower portion of the net may accomplish the same result but there is more probability of fouling than if force be equally applied at both sides. It is further to be noted that the particular configuration and structure of the fasteners and side channel elements will tend to alleviate any fouling or keep it to a minimum and obviously if fouling should occur it may be readily corrected by appropriate manipulation.

It is to be further noted from the structure described that my invention may be readily positioned on existing recreational vehicle doorways and may be maintained there without interference with any of their normal operations.

The foregoing description of my invention is necessarily of a detailed nature so that a specific embodiment of it might be set forth as required, but it is to be understood that various modifications of detail, rearrangement and multiplication of parts might be resorted to without departing from its spirit, essence or scope.

Having thusly described my invention, what I desire to protect by Letters Patent, and what I claim is:

1. A safety barrier for the doorway of a recreational vehicle comprising, in combination:

a flexible barrier net of configuration similar to and size slightly greater than a recreational vehicle doorway to be serviced, the barrier net having spacedly aligned in parallel rows along the side edges thereof plural fasteners each having a thinner body portion with means of attachment to the barrier net and extending laterally outwardly from the barrier net to carry thicker lateralmost fastening portions slidably engagable within lateral guide channels;

an elongate roller fastenably carrying the top of the barrier net and rollably storing the net, said roller being rotatable against bias to allow unrolling of the barrier net, maintainable at a pre-determined partially unrolled position, and re-rollable by reason of said bias upon pre-determined manual manipulation, and being rotatably carried by spacing opposed brackets supported on a recreational vehicle somewhat above and laterally of a doorway to be serviced to position the barrier net for potential extension over the doorway therebelow; and paired opposed lateral guide channels carried by a recreational vehicle parallel to each other and at a spaced distance outwardly adjacent the vertical peripheral sides of a recreational vehicle doorway to be serviced to accept the barrier net therebetween, said lateral guide channels each having a rigid body defining parallel elongate fastener channels extending the length thereof, each fastening channel having an inner larger body portion communicating with smaller outer portion in turn communicating with the surface of the guide body facing the doorway to be serviced, to slidably receive and maintain fasteners carried by the sides of the barrier net.

* * * * *